United States Patent [19]

Urata

[11] Patent Number: 4,774,594
[45] Date of Patent: Sep. 27, 1988

[54] APPARATUS FOR REPRODUCING COMPONENT COLOR VIDEO SIGNALS TIME-AXIS COMPRESSED ON A RECORDING MEDIUM USING WRITE CLOCK SIGNALS CENTERED BETWEEN READ CLOCK SIGNALS

[75] Inventor: Kaoru Urata, Kanagawa, Japan

[73] Assignee: Sony Corporation, Tokyo, Japan

[21] Appl. No.: 13,940

[22] Filed: Feb. 12, 1987

[30] Foreign Application Priority Data

Feb. 28, 1986 [JP] Japan .................................. 61-43038

[51] Int. Cl.⁴ ............................................... H04N 9/89
[52] U.S. Cl. .................................. 358/320; 360/36.1; 360/36.2; 358/310
[58] Field of Search ............... 358/310, 320, 330, 337, 358/339; 360/36.1, 36.2

[56] References Cited

U.S. PATENT DOCUMENTS

| | | | |
|---|---|---|---|
| 4,251,830 | 2/1981 | Tatami | 360/36.2 X |
| 4,389,678 | 6/1983 | Mizukami et al. | 360/36.2 X |
| 4,399,472 | 8/1983 | Yamamoto et al. | 358/320 |
| 4,438,456 | 3/1984 | Yoshinaka | 358/320 X |
| 4,467,368 | 8/1984 | Horstmann | 358/310 |
| 4,577,236 | 3/1986 | Takanashi | 358/320 |
| 4,597,019 | 6/1986 | Nishimoto et al. | 358/310 X |
| 4,608,609 | 8/1986 | Takano et al. | 358/320 |
| 4,672,469 | 6/1987 | Namiki et al. | 360/36.1 X |

*Primary Examiner*—Raymond F. Cardillo
*Assistant Examiner*—W. R. Young
*Attorney, Agent, or Firm*—Lewis H. Eslinger; Jay H. Maioli

[57] ABSTRACT

An apparatus for reproducing a pair of color component signals which have been time-axis compressed and recorded sequentially in recording tracks on a recording medium. During a reproducing operation, shift registers in the color component signal reproducing apparatus carry out time-axis expansions of the respective color component signals and restore the latter to the same timing. A write clock output interval for each of the shift registers is arranged intermediate one read clock output operation and a subsequent read clock output operation for that shift register so that overlap between the write and read operations can be prevented in a time axis processing circuit of simple construction.

12 Claims, 5 Drawing Sheets

APPARATUS FOR REPRODUCING COMPONENT COLOR VIDEO SIGNALS TIME-AXIS COMPRESSED ON A RECORDING MEDIUM USING WRITE CLOCK SIGNALS CENTERED BETWEEN READ CLOCK SIGNALS

BACKGROUND OF THE INVENTION

1. Field of the Invention

The present invention relates to an apparatus which reproduces a pair of color component signals whose time axes have been compressed and which have been sequentially recorded in a time division mode on each of the tracks of a recording medium other than those on which, for example, a luminance signal is recorded.

2. Description of the Prior Art

To achieve recording/reproduction of a video signal having high picture quality and high resolution, a color video signal is separated into a luminance signal and a pair of color component signals (R-Y) and (B-Y). These separated signals are conventionally recorded on different tracks. At the time of such recording, the time axes of the color component signals (R-Y) and (B-Y) are compressed ½ so as to be successively recorded on the same track within a time interval of one horizontal period. During reproduction, the color component signals thus recorded are written into a memory in response to a write clock signal having a predetermined frequency and are read out of the memory in response to a read clock signal having a frequency half the write clock signal frequency. In this way, the time axes of the pair of color component signals (R-Y) and (B-Y) are expanded to provide the interval of the original color component signals. At this time, if a sufficient interval is not provided between the write operation and read operation, the write operation and read operation are often partially overlapped so that normal reproduction operations cannot be carried out. Especially, in a VTR (video tape recorder) in which rotary magnetic heads are switched at every half revolution, a prephaser (variable delay circuit) cannot follow transient time axis variations occurring immediately after the rotary magnetic heads are switched (so-called skew). As a result, when the color component signals are input to a time axis expansion circuit, normal time axis expansion of the color component signals cannot be achieved.

OBJECTS AND SUMMARY OF THE INVENTION

With the above-noted problem in mind, it is an object of the present invention to provide a simple apparatus for reproducing a component color signal and which has enhanced capability to track time variations of a reproduced signal (so-called skews) which accompany head switching.

Another object is to prevent misoperation due to overlap of read and write operations by providing a wide interval or window between the read and write operations in a shift register and to achieve reduction of power consumption and simplification of adjustments.

The above objects can be achieved by providing, in an apparatus for reproducing recording tracks in which a pair of color component signals are time-axis compressed and recorded in a time division mode, and the reproduced color component signals are then time-axis expanded; means for shifting in a time-axis direction one of the color component signals which are time-axis compressed and derived from the corresponding recording track; a plurality of shift registers responsive to write and read clocks for time-expanding a pair of time axis compressed color component signals one of which has been derived from the shifting means; and means for controlling each of the write and read clocks so that an interval during which the write clock is outputted is intermediate an interval during which the read clock is generated and the subsequent interval during which the read clock is generated, whereby the pairing of the reproduced color component signals is made to correspond to that before the time axis compression.

BRIEF DESCRIPTION OF THE DRAWINGS

A more complete understanding of the present invention may be obtained from the following detailed description when read in conjunction with the attached drawings in which.

DETAILED DESCRIPTION OF THE PREFERRED EMBODIMENT

Figure 1:
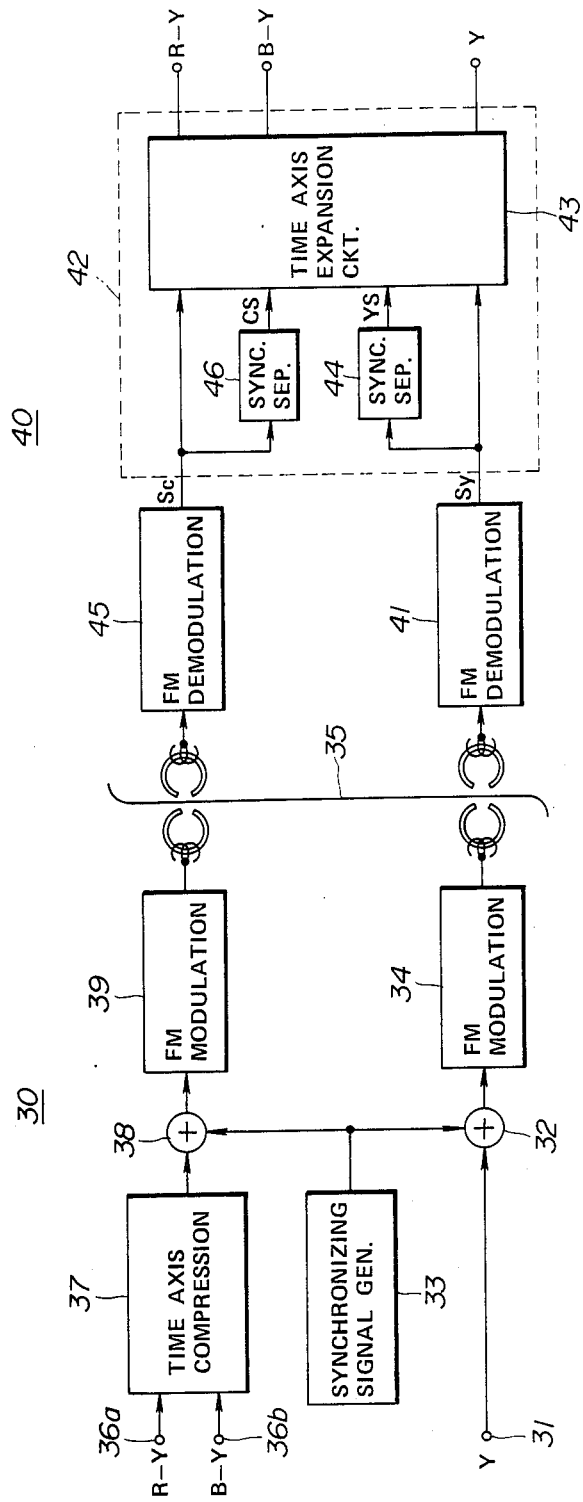
FIG. 1 is a circuit block diagram of a recording and reproducing system of a VTR to which a component color signal reproducing apparatus according to the present invention is applicable.

Referring initially to FIG. 1, it will be seen that, in a recording section 30 of a VTR, a synchronizing signal derived from a synchronizing signal generation circuit 33 is added in an adder 32 to a luminance signal Y transmitted to an input terminal 31. Then, the luminance signal derived from adder 32 is FM modulated in an FM modulator 34 and is recorded on a magnetic tape 35 through a record head. A pair of color component signals R-Y and B-Y respectively transmitted to input terminals 36a and 36b are time-axis compressed by ½ in a compression circuit 37. After such time axis compression, the chrominance component signals R-Y and B-Y are sequentially transmitted from compression circuit 37, and a synchronizing signal derived from synchronizing signal generation circuit 33 is added to the compressed chrominance component signals in an adder 38. The chrominance component signals derived from adder 38 are FM modulated in an FM modulator 39. It is herein noted that the synchronizing signal is used as a reference pulse in order to adjust the time difference between the luminance and chrominance signals recorded in different channels and thereby facilitate the eventual synchronizing signal separation therefrom. The synchronizing signal, i.e., the reference pulse, is added in a rear portion of a horizontal synchronizing pulse of the luminance signal. The IH scanning intervals of the chrominance signals are time-axis compressed to ½H and arranged sequentially in a time division mode. Then, the synchronizing signal (reference pulse) is also added to the compressed chrominance component signals at positions corresponding to those at which the synchronizing signal is added to the luminance signal.

Further, in the reproduction section generally identified at 40 in FIG. 1, a signal reproduced by a playback head from a recording track of the magnetic tape 35 in which the luminance signal is recorded is FM demodulated in an FM demodulator 41. Thereafter, a synchronizing signal YS (or reference pulse) of the luminance signal $S_Y$ demodulated by means of the FM demodulator 41 is derived from a synchronizing signal separation circuit 44 and is transmitted to a time axis expansion circuit 43 in a time axis processing circuit 42. Next, a time division time-axis compressed chrominance signal $S_c$ reproduced from a chrominance signal recording track on magnetic tape 35 by a playback head and FM demodulated by means of an FM demodulator 45 is supplied to time-axis expansion circuit 43. A synchronizing signal CS is separated from signal $S_c$ by a synchronizing signal separation circuit 46 and is also supplied to time axis expansion circuit 43. The synchronizing signal CS of the time division time-axis compressed signal $S_c$ is actually the reference pulse described above. A pair of the component color signals which are respectively time-axis compressed to ½H are arranged between respective adjacent synchronizing signals CS which are 1H (one horizontal interval) apart. The luminance signal and time-axis expanded pair of color component signals are outputted from time axis processing circuit 42 with their time-axis variations eliminated.

Figure 2:
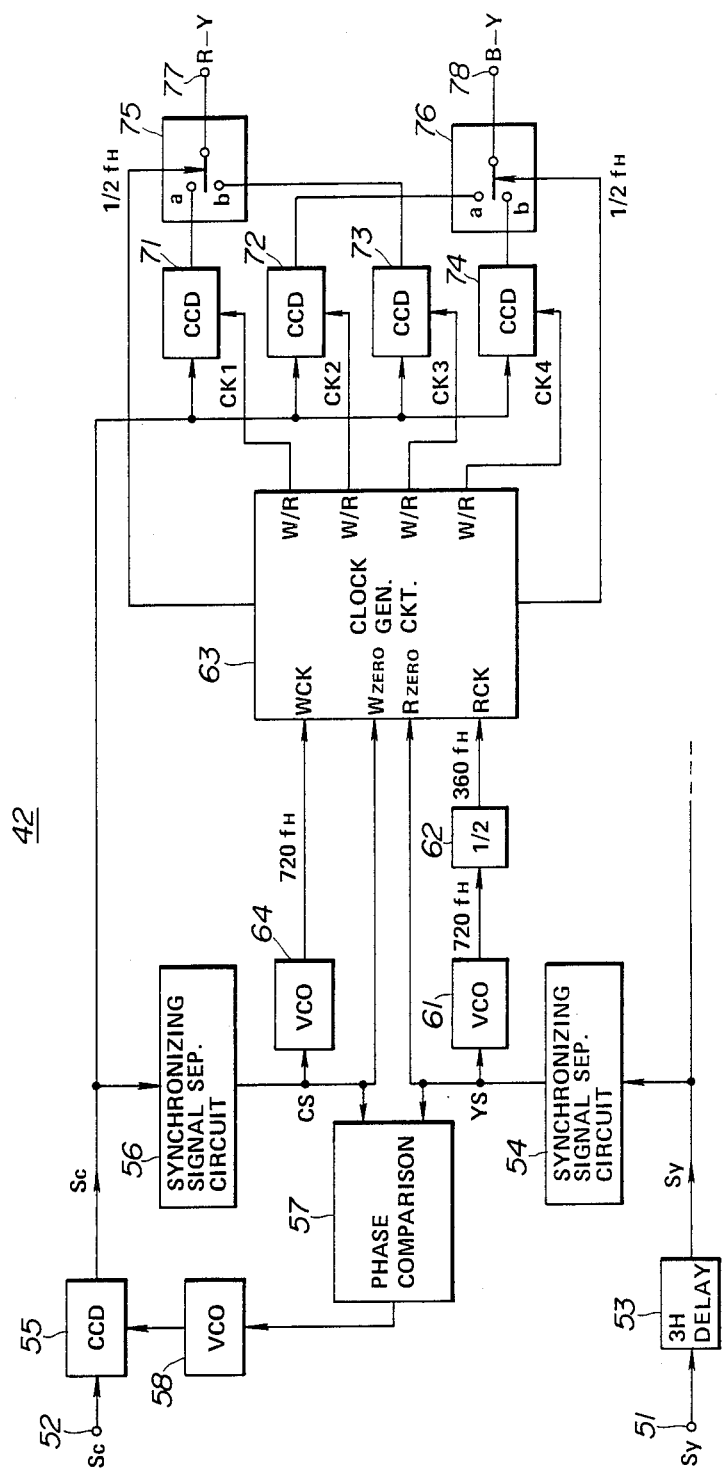
FIG. 2 is a circuit block diagram of a previously proposed time axis processing circuit used in the system shown in in FIG. 1.

In a known time-axis processing circuit 42 shown in FIG. 2, an input terminal 51 receives the luminance signal $S_Y$ which has been FM demodulated by means of FM demodulator 41. An input terminal 52 receives a time division time-axis compressed chrominance signal $S_c$ which has been FM demodulated by means of FM demodulator 45 in FIG. 1. It is to be noted that chrominance signal $S_c$ is delayed by 1H (one horizontal scanning interval) with respect to luminance signal $S_Y$ when the chrominance component signals R-Y and B-Y are time-compressed in time axis compression circuit 37. In other words, the luminance signal $S_Y$ derived from input terminal 51 is advanced by 1H with respect to the chrominance signal $S_c$. The luminance signal $S_Y$ is delayed by 3H by means of a delay circuit 53. A synchronizing signal YS is separated from the delayed luminance signal by a synchronizing signal separation circuit 54. Signal $S_c$ from input terminal 52 is delayed by about 1H in a variable delay circuit 55 using a CCD. A synchronizing signal CS is separated from the delayed signal $S_c$ by a synchronizing signal separating circuit 56. The synchronizing signals YS and CS from synchronizing signal separation circuits 54,56 are transmitted to a phase comparison circuit 57 for detecting a phase difference between synchronizing signals YS and CS. An output of phase comparison circuit 57 corresponding to the detected phase difference is supplied to a voltage controlled oscillator (VCO) 58 and an oscillation frequency of the latter is controlled according to the detected phase difference.

An output pulse from VCO 58 is used as a drive clock for the CCD constituting the variable delay circuit 55. Thus, signal $S_c$ from the variable delay circuit 55 is synchronized with the luminance signal $S_Y$ from delay circuit 53. The circuit comprising phase comparison circuit 57, VCO 58 and variable delay circuit (CCD) 55 is referred to as a prephaser circuit which corrects a time difference between the luminance signal and chrominance signal.

The synchronizing signal YS from synchronizing signal separation circuit 54 is also supplied to a VCO 61. The VCO 61 produces a pulse signal whose phase has been adjusted to the signal YS and whose frequency is, for example, 720 $f_H$ ($f_H$ denotes the horizontal frequency). The pulse signal having a frequency of 720 $f_H$ is frequency divided into a clock signal having a frequency of 360 $f_H$ by means of a ½ divider 62 and the divided clock signal is fed to a clock generator 63 as a read clock RCK. The synchronizing signal CS from synchronizing signal separation circuit 56 is also fed to a VCO 64 which produces a pulse signal whose phase is synchronized with the signal CS and which has a frequency of 720 $f_H$. The pulse signal outputted from VCO 64 is supplied to clock generator 63 as a write clock WCK. CCDs 71,72,73 and 74 constituting shift registers receive the signal from the variable delay circuit 55. The write and read operations for these CCDs 71,72,73 and 74 are controlled by clocks CK1,CK2,CK3 and CK4, respectively, from clock generator 63 so as to time expand the time axis of the input signal applied to each CCD. The resulting time-expanded output signal from CCD 71 is transmitted to a terminal a of changeover switch 75, the output signal from CCD 72 is transmitted to a terminal a of a changeover switch 76, the output signal of CCD 73 is transmitted to a terminal b of the changeover switch 75, and the output signal of CCD 74 is transmitted to a terminal b of changeover switch 76. The color component signal R-Y is obtained from an output terminal 77, while the other color component signal B-Y is obtained from another output terminal 78.

Figure 3:
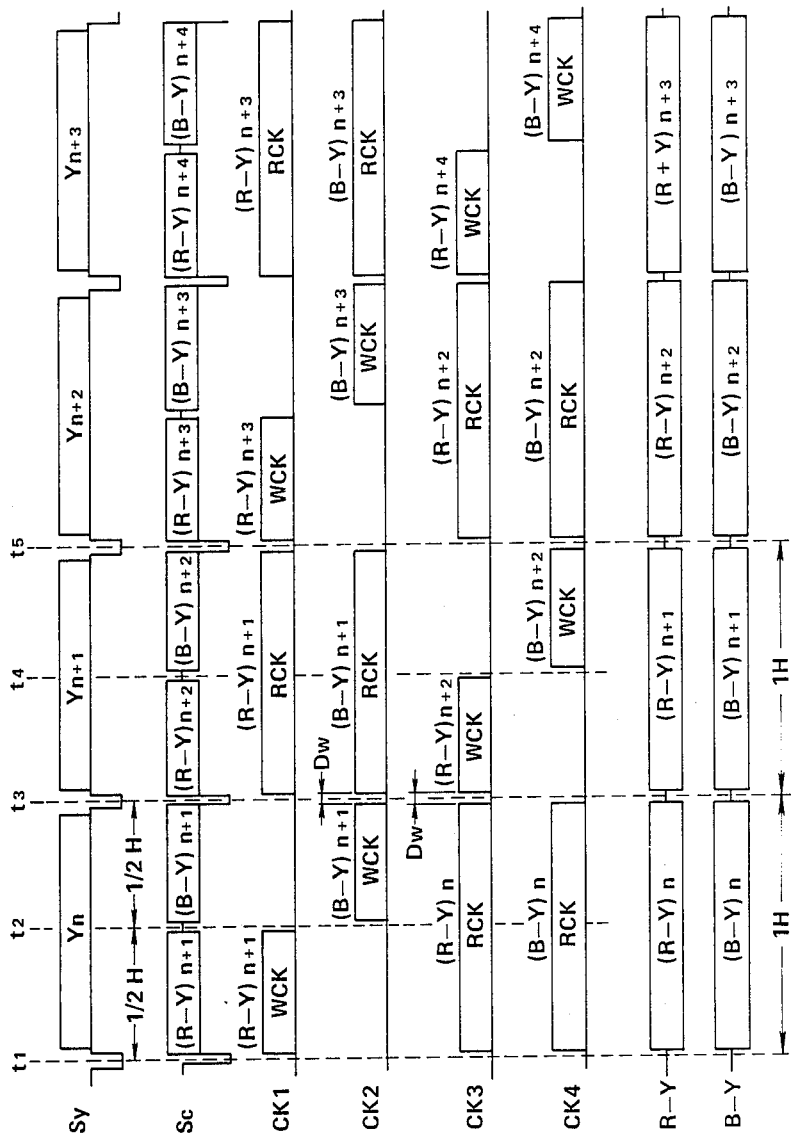
FIG. 3 is a timing chart to which reference will be made in explaining operation of the time axis processing circuit shown in FIG. 2.

A time-axis expansion operation of time-axis processing circuit 42 of FIG. 2 will now be described with reference to FIG. 3. The time division time-axis compressed chrominance signal $S_c$ from variable delay circuit 55 is shown to be advanced by 1H with respect to the luminance signal $S_Y$ from the 3H delay circuit 53. This is because the luminance signal is delayed by 3H in delay circuit 53 while the reproduced chrominance signal is delayed a total of 2H by the action of compression circuit 37 during recording and the action of variable delay circuit (CCD) 55. Hence, as shown in FIG. 3, the time division time-axis compressed chrominance signals $(R-Y)_{n+1},(B-Y)_{n+1}$ in the order of $(n+1)H$ are sequentially arranged during ½ horizontal intervals (between the times $t_1$ and $t_2$ and between the times $t_2$ and $t_3$) with respect to the luminance signal $Y_n$ in the order of nH arranged during the 1H interval between times $t_1$ and $t_3$ For clock CK1 fed from clock generator 63 to CCD 71, a write clock WCK having a frequency of 720 $f_H$ is supplied for the front ½H interval (between times $t_1$ to $t_2$) of the 1H interval between times $t_1$ and $t_3$. Accordingly, a signal component $(R-Y)_{n+1}$ of the time division time-axis compressed chrominance signal $S_c$ is written into CCD 71 between the times $t_1$ and $t_2$ (front half ½H interval). For clock CK2 fed from clock generator 63 to CCD 72, a write clock WCK having a frequency of 720 $f_H$ is supplied for the back ½H interval (between times $t_2$ to $t_3$). As a result, a signal $(B-Y)_{n+1}$ which is transmitted in the back half of the horizontal interval is written into CCD 72. Each of the color component signals $(R-Y)_{n+1},(B-Y)_{n+1}$ written into CCDs 71,72 is read out in response to clocks CK1,CK2 constituted by a read clock RCK during the next 1H interval between the times $t_3$ and $t_5$. The frequency of read clock RCK is selected as 360 $f_H$, that is, ½ of the write clock WCK, so that the chrominance signals read out from the CCDs 71 and 72 are expanded twice and thereby the chrominance signal having the original time axis will be generated therefrom. Thus, a delay of 1H occurs in the processing circuit 42 so that the delayed chrominance signal is aligned in time with the luminance signal. In other words, the chrominance signals $(R-Y)_{n+1}, (B-Y)_{n+1}$ produced from the changeover switches 75,76 between times $t_3$ and $t_5$ are the same $(n+1)H$ order signals as the luminance signal $Y_{n+1}$ then being obtained. It is noted that $D_w$ on FIG. 3 denotes a permissible interval or window between a write operation and read operation of each of the CCDs 71 through 74.

The CCDs 71 and 72 described above, carry out the time axis expansions of the color component signals R-Y and B-Y, respectively. Since a 2H interval is required to perform the time axis expansion of the 1H signal, the other pair of CCDs 73 and 74 are provided so that the read and write operations of the 2H interval are carried out alternately by the CCDs 71 and 72 and by the CCDs 73 and 74. The changeover switches 75 and 76 are switched at every horizontal interval to select the output signals from the CCD pairs 71 and 72 and 73 and 74, alternately. Thus, the color component signals R-Y,B-Y are obtained at the respective output terminals 77,78.

In such a time axis expansion circuit 43 as shown in FIG. 2, the permissible interval or window $D_w$ between the write and read operations in the respective CCDs 71 through 74 can be only approximately ±1 to 2.5 microseconds. Therefore, if a time axis error (jitter) between the luminance signal and chrominance signal exceeds the permissible interval, overlapping of the write operation and read operation often occurs so that normal reproducing operations cannot be carried out.

Construction and operation of a signal processing circuit according to the present invention for avoiding the above problem will now be described with reference to FIGS. 1,4 and 5.

Figure 4:
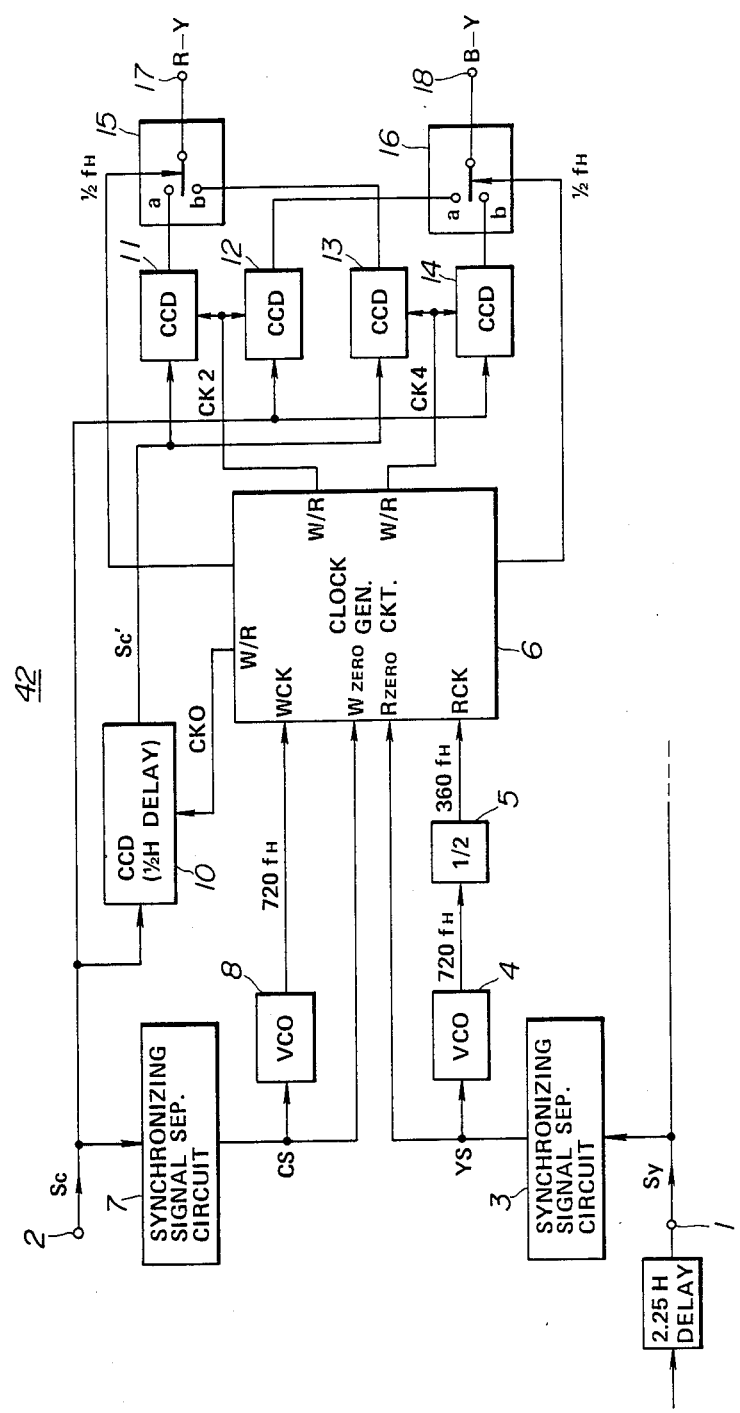
FIG. 4 is a circuit block diagram of a time axis processing circuit according to a preferred embodiment of the present invention.

In FIG. 4, an input terminal 1 receives the luminance signal $S_Y$ which has been FM demoulated, for example, in the FM demodulation circuit 41 in FIG. 1. Another input terminal 2 receives the chrominance signal (time-divided time-axis compressed chrominance signal) $S_c$ from the FM demodulator 45. It should be noted that the luminance signal $S_Y$ received at the input terminal 1 in FIG. 4 is delayed up to 1.25H (1¼H), as shown in FIG. 5, with respect to the chrominance signal $S_c$ received at input terminal 2. If, for example, the luminance signal $S_Y$ derived from FM demodulator 41 is advanced by 1H with respect to the chrominance signal $S_c$, the FM demodulated luminance signal $S_Y$ needs to be delayed by 2¼H by means of a delay circuitry such as a CCD. Thus, the luminance signal $S_Y$ is always delayed by 1¼H with respect to the chrominance signal $S_c$ at the respective input terminals 1 and 2.

Figure 5:
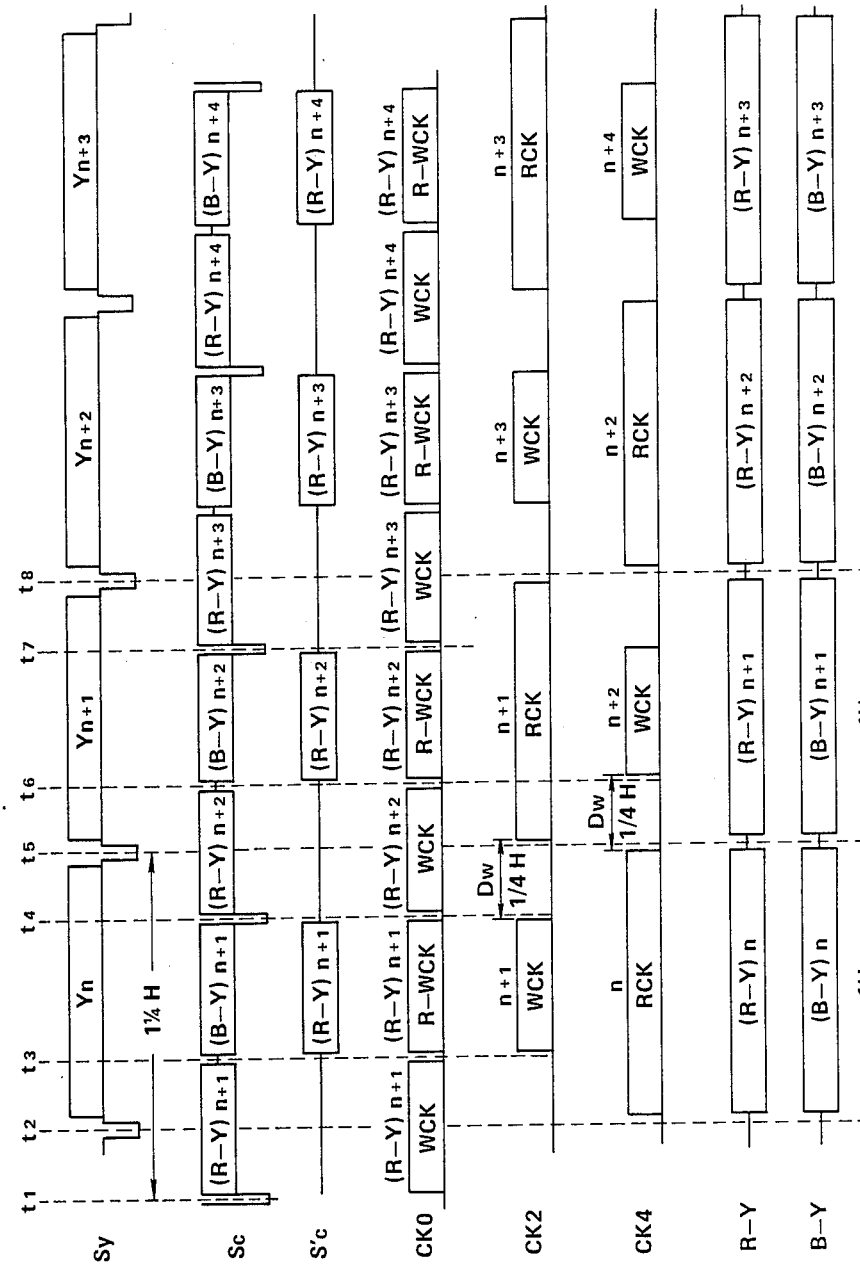
FIG. 5 is a timing chart to which reference will be made in explaining operation of the time axis processing circuit shown in FIG. 4.

Hence, for example, when the pair of color component signals $(R-Y)_{n+1}, (B-Y)_{n+1}$ in the order of $(n+1)H$ are arranged in the time sharing mode whose time axes have been compressed to ½H within the 1H interval (one horizontal interval) from time $t_1$ to time $t_4$ shown in FIG. 5, the luminance signal $Y_{n+1}$ in the order of $(n+1)H$ is arranged in one horizontal interval from time $t_5$ to time $t_8$ which has been delayed by 1¼H.

The luminance signal $S_Y$ derived from the input terminal 1 is supplied to a synchronizing signal separation circuit 3 to separate a synchronizing signal (or reference pulse) YS. This synchronizing signal YS is then fed to a VCO (voltage controlled oscillator) 4. The VCO 4 produces a pulse signal whose phase is locked to that of the above-described signal YS and whose frequency is, for example, 720 $f_H$ ($f_H$ denotes the horizontal frequency). The pulse signal having a frequency of 720 $f_H$ is divided into a pulse signal having a frequency of 360 $f_H$ by means of a ½ divider 5. The frequency divided pulse signal is supplied to a read clock terminal of a clock generation circuit 6 as a read clock RCK. On the other hand, the chrominance signal $S_c$ derived from input terminal 2 is supplied to a synchronizing signal separation circuit 7 to separate a synchronizing signal (or reference signal) CS. The synchronizing signal CS is then fed to a VCO 8. The VCO 8 produces the pulse signal having a frequency 702 $f_H$ ($f_H$ denotes the horizontal frequency) and having a phase locked to the above-described signal CS. The pulse signal derived from VCO 8 is supplied to a write clock terminal of clock generation circuit 6 as a write clock WCK. It is to be noted that the above-described synchronizing signals YC,CS are also supplied to clock generation circuit 6 for determining read and write reference timings of CCDs, as will be described later.

The chrominance signal $S_c$ in a time division time-axis compressed state derived from input terminal 2 is selectively time delayed by ½H by means of a CCD 10 so that the pair of color component signals R-Y,B-Y are relatively shifted so that their phases become aligned with each other. That is to say, as shown in FIG. 5, a clock CKO transmitted from clock generation circuit 6 to CCD 10 is arranged such that a write clock WCK is supplied during a front half interval (between times $t_1$ and $t_3$) of a 1H interval (between times $t_1$ and $t_4$) and a read clock R-WCK is supplied during a back half interval (between times $t_3$ and $t_4$). The output pulse from VCO 8 having the frequency of 720 $f_H$ is used for the write clock WCK and read clock R-WCK. Hence, the output signal $S_{c'}$ from CCD 10 is such that the color component signal R-Y occurring during the front half of a 1H interval of chrominance signal $S_c$ is delayed by ½H and is aligned with the color component signal B-Y occurring during the back half of the 1H interval of chrominance signal $S_c$. Therefore, for these chrominance signals $S_{c'}, S_c$, the color component signals R-Y,B-Y are mutually aligned with each other during the ½H interval corresponding to the center position of each 1H interval of the luminance signal $S_Y$. If it is assumed that the CCD 10 which constitutes a shift register, is provided with 341 stages, the number of pulses of each clock WCK and R-WCK occurring during the ½H interval is 341. As a result, the signal write and read operations of the CCD 10 are carried out during an interval slightly shorter than the ½H interval which comprises 360 clock pulses. As is apparent from FIG. 5, the write and read operations are alternately carried out for half line periods for each 1H period.

The chrominance signal $S_c$, delayed by means of CCD 10 is supplied to two CCDs 11 and 13 for time-axis expansion operations. On the other hand, the chrominance signal $S_c$ from input terminal 2 is directly transmitted to two CCDs 12 and 14 for time-axis expansion operations. These CCDs 11 through 14, have the same number of shift stages (341 stages) as CCD 10 has. A clock CK2 derived from clock generator 6 is supplied to the pair of CCDs 11 and 12 to which the pair of color component signals R-Y and B-Y are respectively supplied. Another clock CK4 is derived from clock generator 6 and applied to CCDs 13 and 14 so that the write and read operations are carried out at 2H intervals. It is to be noted that the common clock CK2 transmitted to CCDs 11 and 12 has a phase difference of 1H in respect to the common clock CK4 transmitted to the other CCDs 13 and 14.

The clock CK2 for commonly controlling CCDs 11 and 12 is a signal having a period of 2H and in which the write clock WCK is generated during a ½H interval (from times $t_3$ to $t_4$) and the read clock RCK is generated during the 1H interval (from time $t_5$ to time $t_8$) of the luminance signal $S_Y$ which follows immediately after the end of the output of the write clock WCK. The output signal having a frequency of 720 $f_H$ derived from VCO 8 is used as the write clock WCK, which is synchronized with the synchronizing signal CS of the chrominance signal $S_c$. The output signal having a frequency of 360H from divider 5 is used as the read clock RCK which is synchronized with the synchronizing signal YS of the luminance signal $S_Y$. Hence, in CCD 11, after the color component signal $(R-Y)_{n+1}$ has been written during the ½H interval between times $t_3$ and $t_4$, the signal $(R-Y)_{n+1}$ is read out with two times time-axis expansion during the 1H interval between times $t_5$ and $t_8$ of the synchronizing signal of the luminance signal. At the same time, the chrominance signal $(B-Y)_{n+1}$ is written in CCD 12 during the ½H interval between times $t_3$ and $t_4$. During the 1H interval between times $t_5$ and $t_8$, the same signal $(B-Y)_{n+1}$ is read out with time axis expansion. In the same way as described above, these write and read operations are repeated for each 2H interval. It is to be noted that, since clock CK4 supplied commonly to the CCDs 13 and 14 is a repetition of the clock CK2 except its phase is deviated by 1H from the phase of clock CK2, the pair of CCDs 13 and 14 carries out the same operations as the pair of CCDs 11 and 12, but under the condition of a time delay (or time advance) of 1H.

The output signal from CCD 11 is transmitted to a terminal a of a changeover switch 15, the output signal from CCD 12 is applied to a terminal a of a changeover switch 16, the output signal from CCD 13 is transmitted to a terminal b of changeover switch 15, and the output signal from CCD 14 is transmitted to a terminal b of changeover switch 16. These two changeover switches 15 and 16 are alternately switched at every horizontal interval to select terminals a or b of both switches 15,16 in response to a switching control signal having a frequency of ½ $f_H$ (2H period) which is derived from clock generator 6. Hence, changeover switch 15 provides the color component signal R-Y at an output terminal 17 and changeover switch 16 provides the other color component signal B-Y at an output terminal 18, and such color component signals are synchronized with the luminance signal.

The following is an explanation of the write and read operations for each 2H period on the basis of the above-described common clocks CK2,CK4.

Since a write clock WCK interval is centered in a non-read interval (1H) sandwiched between read clock RCK output intervals (1H), approximately ¼H is available as the permissible interval or window $D_w$ before and after the write clock output interval. The width of the window $D_w$ is wide enough to carry out the correction of the time axis error between the luminance signal and color component signal in the reproduction mode including correction for any transient time axis variation (so called, skews) generated when the rotary magnetic heads are switched.

Hence, the above-described prephaser circuit is not necessary, so that the circuit scale is reduced and low power consumption is achieved. Further, contrary to the previously proposed signal processing circuit, limiter and Y-C phase adjustments required for the prephaser circuit are not necessary, and labor costs can be accordingly reduced. Furthermore, since the time axis processing operation in the preferred embodiment is a start-and-stop method in which the read and write operations are separated with respect to time, the tracking capability for transient and abrupt time axis variations become remarkably high as compared with the prephaser method in which the delay time is continuously varied. Consequently, ill effects, such as, noise and number of shift stage differences, will not arise.

It is to be noted that the present invention is not limited to the above-described preferred embodiment. For example, after the phase alignment of the pair of color component signals and time axis expansion using the common clocks CK2 and CK4, phase alignment between the color component signals whose time axes have been expanded and the luminance signal can be effected. In addition, the write clock operation during the time axis expansion operation can be shifted to a position displaced forwardly or rearwardly from the center position between the adjacent two read clock intervals. However, it should be noted that, in such case, the window length is asymmetrical in the positive and negative directions. Furthermore, although in the above-described embodiment, a stop interval is provided between the write and read intervals of CCD 10 which constitutes time delay means for the phase alignment of the color component signals, the delay amount is accurately set to ½H (stage numbers of CCD is 360 stages) so that the write clock WCK (having the frequency of 720 $f_H$) may directly be inputted to CCD 10.

Although a preferred embodiment of the invention and specific modifications thereof have been described in detail herein, it is to be understood that the invention is not limited thereto, and that various changes and further modifications may be effected therein by one skilled in the art without departing from the scope or spirit of the invention as defined in the appended claims.

What is claimed is:

1. In an apparaus for reproducing pairs of color component signals which are time-axis compressed and sequentially recorded in a time-division mode in the same record tracks on a recording medium, the combination of:

means for reproducing color component signals from said recording medium;

means for time-shifting one of said time-axis compressed color component signals with respect to the other of the time-axis compressed color component signals reproduced from a corresponding one of said record tracks;

means for generating write and read clock signals;

a plurality of shift registers responsive to said write and read clock signals for time-expanding said one of the time-axis compressed color component signals derived from said means for time-shifting and said other time-axis compressed color component signal reproduced from said corresponding record track, respectively; and means for controlling said write and read clock signals for each of said shift registers so that each interval during which said write clock signal is generated for the respective one of said shift registers is centered midway between one interval during which the read clock signal is generated for said one shift register and a subsequent interval during which the read clock signal is again generated for said one shift register, whereby the pairs of color component signals are reproduced in the relation existing before the time-axis compression thereof.

2. The apparatus according to claim 1; wherein said means for time-shifting shifts said one of the color component signals in the time-axis direction thereof so as to be aligned with said other of the color component signals.

3. The apparatus according to claim 1; wherein said means for time-shifting comprises another shift register for delaying said one of the color component signals by ½ horizontal scanning interval so that said one of the color component signals is aligned with the other of the color component color signals reproduced from the corresponding record track.

4. The apparatus according to claim 3; wherein said means for controlling further controls second write and read clock signals applied to said other shift register in such a way that the second write clock signal is produced during a front half of a horizontal scanning interval of the pair of color component signals derived from the corresponding record track and the second read clock signal is produced during a back half of said horizontal scanning interval of the pair of color component signals.

5. The apparatus according to claim 4; further comprising means for separating a synchronizing signal from the pair of color component signals reproduced from the corresponding recording track and a voltage controlled oscillator which generates an output pulse signal connected to said means for controlling and whose phase is locked to the synchronizing signal, said output pulse signal forming said second write and read clock signals applied to said other shift register.

6. The apparatus according to claim 5; wherein said other shift register is constituted by a charge coupled device having a predetermined number of shift stages, and wherein each of the second write clock signals contains a predetermined number of pulses equal to said predetermined number of shift stages.

7. The apparatus according to claim 6; wherein said plurality of shift registers comprises two pairs of charge coupled devices having the same number of shift stages as the charge coupled device constituting said other shift register; and wherein said one of the color component signals derived from said other shift register is applied to one charge coupled device of each of said two pairs of charge coupled devices and said other of the component signals derived from the corresponding recording track is applied to the other charge coupled device of each of the two pairs of charge coupled devices, and the first mentioned write and read clocks from said means for controlling include a first sequence of write and read clocks applied to one of said pairs of charge coupled devices and a second sequence of write and read clocks applied to the other of said pairs of charge coupled devices.

8. The apparatus according to claim 7; wherein a luminance signal is recorded in record tracks apart from. said record tracks containing the respective pairs of time-axis compressed color component signals, and each luminance signal, as reproduced, is delayed by 1.25 horizontal scanning intervals with respect to the respective pair of color component signals; and wherein said first and second sequences of write and read clocks each have a period of two horizontal scanning intervals such that said write clock of the first sequence occurs for the one-half horizontal scanning interval during which the pair of color component signals are in phase with said one color component signal delayed by said other shift register and said read clock of the first sequence occurs during an initial horizontal scanning interval of the reproduced luminance signal after said write clock of the first sequence is applied to said one pair of charge coupled devices.

9. The apparatus according to claim 8; wherein said write clock of the first sequence is a pulse signal derived from said voltage controlled oscillator.

10. The apparatus according to claim 8; further comprising a second voltage controlled oscillator which outputs a pulse signal having a predetermined frequency and is synchronized with said luminance signal, and a frequency one-half of said predetermined frequency of the pulse signal produced from said second voltage controlled oscillator, said other pulse signal from the frequency divider being employed by said means for controlling to constitute said read clock of the first sequence.

11. The apparatus according to claim 8; wherein the phase of said second sequence of write and read clocks is deviated by a horizontal scanning interval from that of said first sequence of write and read clocks.

12. The apparatus according to claim 8; wherein said one-half horizontal scanning intervals in which said write clocks of the first and second sequences are produced from the means for controlling are substantially centered between the horizontal scanning intervals in which said first and second read clocks of the first and second sequences, respectively, are outputted for successive periods.

* * * * *

UNITED STATES PATENT AND TRADEMARK OFFICE
CERTIFICATE OF CORRECTION

PATENT NO. : 4,774,594
DATED : September 27, 1988
INVENTOR(S) : Kaoru Urata

It is certified that error appears in the above-identified patent and that said Letters Patent is hereby corrected as shown below:

Column 4, line 50, after "$t_3$" insert --.--.

Column 5, line 41, change "demoulated" to --demodulated--.

Column 7, line 48, should not be new paragraph; should continue sentence on line 47.

line 48, change "signa1" to --signal--.

Column 10, line 12, after "from" delete ".".

line 35, after "frequency" insert --divider which produces another pulse signal with a frequency--

Signed and Sealed this

Twenty-eighth Day of March, 1989

Attest:

DONALD J. QUIGG

Attesting Officer

Commissioner of Patents and Trademarks